United States Patent

Dee

[15] 3,687,506

[45] Aug. 29, 1972

[54] FLUID PAD BEARING

[72] Inventor: Colin William Dee, "Green Acres," 64 Cranford Bottom, Colehill, Wimborne, England

[22] Filed: March 8, 1971

[21] Appl. No.: 121,864

[30] Foreign Application Priority Data

March 9, 1970 Great Britain..........11,130/70

[52] U.S. Cl. ................................................308/9
[51] Int. Cl. .............................................F16c 17/16
[58] Field of Search............................308/73, 122, 9

[56] References Cited

UNITED STATES PATENTS 1,595,744  8/1926  Trumpler.....................308/73

Primary Examiner—Martin P. Schwadron
Assistant Examiner—Frank Susko
Attorney—William Anthony Drucker

[57] ABSTRACT

A fluid pad bearing member has a housing, at least three pad elements disposed in a circumferential assembly with external radial clearance in the housing, each pad element having an internal bearing surface adapted to coact with a cylindrical journal to define a bearing volume, and each pad element being pivotable as a two-arm lever about an axis substantially parallel to the axis of rotation of the bearing. The assembly of pad elements includes a plurality of circumferentially-spaced fluid intake slots each opening at their inner end into the bearing volume, said slots having a greater cross-sectional dimension in axial direction and a lesser cross-sectional dimension in the circumferential direction, and means are provided for resiliently loading the pad elements inwardly with respect to the housing.

10 Claims, 6 Drawing Figures

PATENTED AUG 29 1972 3,687,506

INVENTOR:
COLIN W. DEE

FLUID PAD BEARING

This invention relates to so-called pad bearings which are already known in the bearing art as capable of operation aerodynamically or hydrodynamically. In such a bearing, a cylindrical journal is relatively rotatable within three or more pads which are spaced circumferentially about the journal and which have their adjacent surface of the same curvature. The pads are pivotable, as a two-arm lever, about an axis parallel to the axis of rotation of the journal, and the broad principle of operation is that as the journal rotates within the sets of pads, a gas or liquid is drawn in, through the spacing between the ends of adjacent pads, until gas or liquid is present between each pad and the journal. As the gas or liquid is carried further circumferentially by rotation of the journal, it becomes formed into a cushion under pressure between the trailing portion of the pad and the journal. The pad assumes an equilibrium position of pivoting, according to the balance achieved between the pressure of the gas or liquid under its leading portion and the cushion under its trailing portion.

In a non-pivoted journal bearing an attitude angle of the journal center to bearing center in relation to the applied load is developed as the journal speed increases.

In a pivoted pad journal bearing the attitude angle is sensibly zero, and such bearings are notably free from the phenomenon known as half-speed whirl. To reduce the tendency of pad instability occurring, and to increase the stiffness of the bearing, it is common practice to preload one or more pads of the set.

One method of applying this preload is by means of a resilient loading device e.g. a spring. Another method of preload is to adjust the radial position of the pivoting points of one or more pads in relation to the remainder by a fixed amount. This delays the on-set of half-speed whirl or self-excited whirl. In order to increase the intake of gas or liquid between the leading portion of the pad and the journal, it is known to provide a circumferential recess in the leading portion, so that a greater quantity of gas or liquid is fed to the cushion formed between the trailing portion and the journal, and this results in enhancement of the load-carrying and "stiffness" characteristics of the bearing. It is also known in the art to provide resilient loading of all of the pads radially inwards, e.g. by providing a resiliently-loaded pivot or by applying resilient loading acting generally on the pad to urge it radially inwards. However, in the pad bearings known hitherto, the pads have been utilized essentially as separate units acting independently each from the others.

The object of the present invention is to provide an improved construction of pad bearing with a novel form of fluid intake and which, as a result of its hybrid formation, is capable of operation as either a self-operating bearing or an externally pressurized bearing, or a combination of both, whereby it may be independent of viscosity and density factors of the fluid and so can be used, without change of design or dimensions, for gases, vapors and liquids. Other advantages which derive from the improved construction will become apparent from the following description.

According to the present invention a fluid pad bearing member comprises a housing, at least three pad elements disposed in a circumferential assembly with external radial clearance in said housing and each having an internal bearing surface adapted to coact with a cylindrical journal to define a bearing volume, each pad element being pivotable as a two-arm lever about an axis substantially parallel to the axis of rotation of the bearing, said assembly of pad elements including a plurality of circumferentially-spaced fluid intake slots each opening at their inner end into the bearing volume, said slots having a greater cross-sectional dimension in the axial direction and a lesser cross-sectional dimension in the circumferential direction, and resiliently compressible material in closed loop formation disposed about the assembly of pad elements and under compression between the pad elements and the housing so as to load the pad elements resiliently inwardly with respect to the housing.

The resiliently compressible material, such as an O-ring of rubber-like material, may also serve as a circumferential fluid seal between the pad elements and the wrapper.

In a preferred form, the resiliently compressible material is arranged as two axially spaced loops which serve, with the internal surfaces of the housing and the external surface of the elements of the pad assembly, to define a fluid feed channel in communication with the outer end of all of the fluid feed slots.

The outer surface of the pad elements may be provided with an outwardly facing recess of U-section for the seating of the or each loop.

In the preferred form, the median longitudinal plane of each slot is a tangent to a circle co-axial with the axis of rotation of the bearing, so as to lead in the fluid in the direction of rotation of the journal.

Two or more slots may be arranged side by side, i.e. in the axial direction, at such a large spacing that each circumferential set of slots is substantially independent of the slots of any other set, or at such smaller spacing that the adjacent slots constitute in effect a single wider slot having one or more lands across it.

Each pad element has an upstream lever arm and a downstream lever arm, considered in the direction of relative rotation of the bearing surface of the journal member. In a first form of construction, each slot is formed within the body of the pad element and passes through the upstream lever arm of that element for feeding fluid to a position beneath the bearing surface of that lever arm. Preferably the pad elements abut in fluid-tight manner at their adjacent ends so as to form a non-gapped assembly. In another form, the pad elements are each formed at each end with mating surfaces such that neighboring pad elements abut against each other by axially-spaced lands defining a fluid intake slot between them, said mating surfaces being shaped such that they remain in abutment under the resilient inward loading throughout the range of pivoting movement of the pad elements. In each form, the upstream lever arm of each pad element may include a Rayleigh step formation to which the fluid is fed.

In a preferred construction, there are provided three similar pad elements symmetrically disposed about a journal and with each neighboring pair defining such a slot intake.

Each pad element is arranged to be pivotable, about an axis intermediate its ends, so as to be capable of adjusting according to its running conditions. This facility of pivoting may be arranged by providing on the radially external surface of each pad element a projection disposed intermediate its ends to serve as a fulcrum for the pivoting movement of the pad element. In a preferred form, the radial protrusion abuts against the same loop or O-ring as is used for applying general radial-inwards pressure to the pad elements. Accordingly, each pad element seats generally against the internal periphery of each of a pair of O-rings, and whereas at least a sealing engagement between the two is obtained all over the external length of the pad element, there is a higher degree of compression between the external protrusion of the pad element and the abutting area of the O-ring. In such a construction, the pivoting of the pad element will result in a rolling movement so that, as all three pad elements pivot in unison, the entire assembly of pad elements travels slightly circumferentially while they remain in abutment at their ends.

The provision of an external projection on each pad element may conveniently be obtained by external forming, e.g. milling or grinding, of two arcs of different centers and/or radius on the exterior of the pad element.

A preferred material for formation of the pad element is silicon nitride which has extremely advantageous properties of surface hardness and resistance to abrasion.

In order that the nature of the invention may be readily understood, an embodiment of pad bearing member incorporating the above-described feature is hereinafter particularly described with reference to the figures of the accompanying drawings, wherein.

Figure 1:
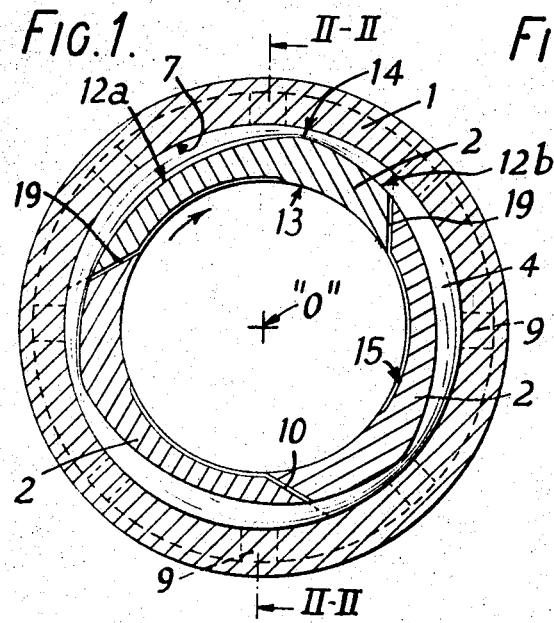
FIG. 1 is a diametral section of a pad bearing member, taken on the line I—I of FIG. 2.
Figure 2:
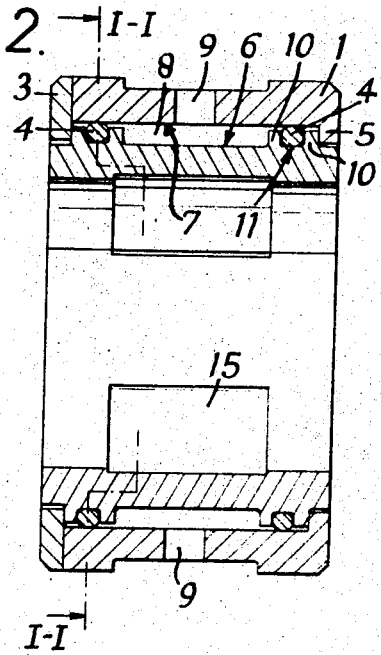
FIG. 2 is an axial section of the pad bearing member, taken on the line II—II of FIG. 1.

Referring to FIGS. 1 and 2, the pad bearing member comprises an external housing 1, a set of three similar pad elements 2, an end ring 3, and two O-rings 4.

The housing 1 is an annulus having on one end a rib 5 serving as an axial end stop for the assembly of pad elements. At the other end, the axial end stop is constituted by the ring 3 secured onto the housing 1 and leaving just sufficient clearance axially for the pad elements to be left free to pivot.

On the external circumference of the set of three pad elements there is formed a peripheral recess 6, and the recess 6 and the internal surface 7 of the housing 1 define between them a fluid feed channel or plenum chamber 8. The housing 1 has a plurality of circumferentially spaced holes 9 for feed of fluid to the channel 8.

On the external periphery of the set of pad elements, at axially spaced positions, there are provided two pairs of ribs 10, each pair defining between them a groove or seating 11 within which is disposed the respective O-ring 4. The whole of the external periphery of each O-ring is in fluid-tight sealing engagement with the internal surface 7 of the housing 1. The whole of the internal periphery of each O-ring is in fluid-tight engagement with the base of the groove 11 on the exterior of the set of pad elements.

Figure 3:
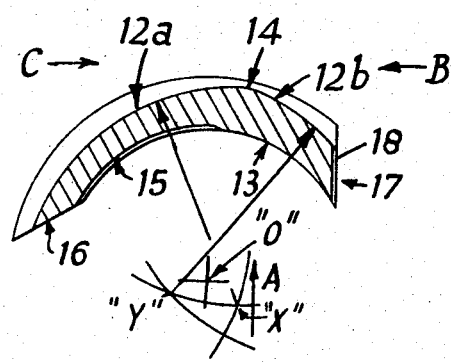
FIG. 3 is a radial section through a pad element.
Figure 4:
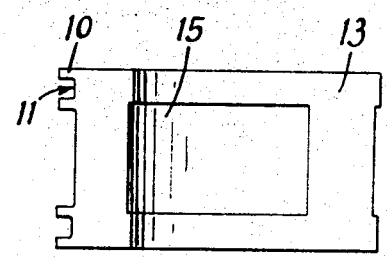
FIG. 4 is an elevation of the pad element of FIG. 3, viewed in the direction of the arrow "A" in FIG. 3.
Figure 5:
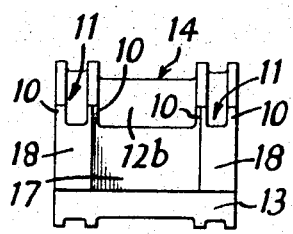
FIG. 5 is an elevation of the pad element of FIG. 3, viewed in the direction of the arrow "B" in FIG. 3.
Figure 6:
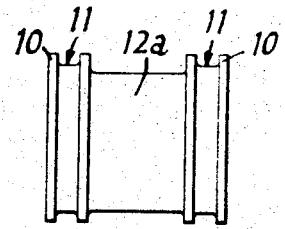
FIG. 6 is an elevation of the pad element of FIG. 3, viewed in the direction of the arrow "C" in FIG. 3.

Each pad element is formed with its external surface having two portions 12a and 12b respectively centered at points "X" and "Y," see FIG. 3, each spaced from the center "0" of the internal bearing surface 13. The two surface portions 12a and 12b meet at an apex 14 which abuts against the internal periphery of the O-ring and provides an area of maximum compression of the O-ring. Pivoting movement of the pad element can take place by a rolling motion of the apex 14, in contact with the O-ring. Due to the resilience of the O-ring, a certain amount of axial inclination of the pad element can also take place, to accommodate divergence between the axis of the journal and the axis of the internal surface 7 of the assembly.

The journal, to coact with the three pad elements, is not shown in the drawing but would be a simple cylindrical member having an external diameter corresponding to or slightly smaller than the internal diameter of the set of pad elements in their rest position seen in FIG. 1. It would rotate in the direction shown by the arrow in FIG. 1.

Each pad element is provided, at 15, with a recess corresponding to the conventional "Rayleigh step."

The upstream end surface 16 of each pad element 2 is a plane surface formed at a tangent to a circle having as its center the axis "O." The downstream end of each pad element 2 is formed with a plane surface area 17, formed as a tangent to a circle having as its center the axis "O," disposed between two lands 18, 18. When the set of pad elements is assembled, the lands 18, 18 of one pad element abut against the plane end surface 16 of the neighboring pad element and thereby define a tangential slot 19. At its outer end each slot 19 opens into the fluid feed channel 8, and at its inner end each slot 19 opens into the respective "Rayleigh step" recess 15 of the downstream pad element.

In operation, fluid enters the slots 19 from the feed channel 8 and passes into the step recess 15. The rotation of the journal carries the fluid round until it becomes compressed beneath the downstream lever arm portion of the two-arm lever constituted by each pad element. The journal thus becomes supported by three cushions of fluid. As the speed of the journal increases, the respective pad elements each adopt a tilted position of equilibrium, obtained by rolling about the apex 14. During this tilting movement, the lands 18 of one pad element slide along the abutting end surface 16 of the neighboring pad element, but they remain in abutment, and thus continue to define the slot 19, although the length of the full slot varies slightly. The inward pressure exerted by the O-ring keeps the set of pad elements in assembled abutting condition.

If desired, instead of merely allowing the rotation of the journal to draw fluid in through the slots 19, externally pressurized fluid may be fed to the channel 8, thereby resulting in greater flow of fluid to the step recesses 15, and thus increased application of fluid to the respective cushion of that pad element. It has been known hitherto to use a feed of fluid, radially inwards through an orifice in a pad element, for the purpose of lifting the pad element off the journal temporarily during commencement of rotation, this being known as "-jacking fluid," but that operation is distinguished from the present function wherein the applied fluid becomes incorporated in the cushion for normal operation.

It has been found that the tangential slots 19 permit a flow of fluid which is independent of factors of viscosity and density. Accordingly, within obvious limits, it is possible to feed in gases, vapors and liquids to the same pad bearing member without modification thereof. The same member is thus capable of use on gas, vapor or liquid, or any combination thereof. The bearing can thus be utilized with a function which is solely aerodynamic or hydrodynamic, or partially aero- or hydrodynamic, and partially aero- or hydrostatic. The recess 15 ("Rayleigh step") can be omitted. The manufacture of the pad bearing member is relatively very simple, because the housing 1 and the end ring 3 require only simple machining operations. The pad elements 2 can readily be produced from an annulus which is firstly cut tangentially, then milled or ground (and lapped) at its ends to produce the recess surface area 17, the lands 18 and the plane surface 16. The external surface portions 12a and 12b can also be easily produced in similar manner. The assembly operation consists merely of placing the pad elements together, adding the two o-rings, inserting into the housing 1, and securing the end ring 3. The entire bearing member can be of small dimensions suitable for replacement of a conventional ball race.

During operation, the fluid taken in or pumped in at the slots 19 passes to exhaust laterally at both sides axially of the bearing member. The exhausting of the fluid will thus prevent entry into the bearing member of any fluid which is under a pressure not exceeding that derived from the operation of the bearing, and thus the bearing member is capable of acting as a seal about the journal.

When fluid under pressure is fed to the channel 8, there is then provided an annulus of fluid under pressure about the entire set of pad elements 2, and this adds to the damping obtained from the presence of the two O-rings about the pad elements.

I claim:

1. A fluid pad bearing member comprising a housing, at least three pad elements disposed in a circumferential assembly with external radial clearance in said housing and each having an internal bearing surface adapted to coact with a cylindrical journal to define a bearing volume, each pad element being pivotable as a two-arm lever about an axis substantially parallel to the axis of rotation of the bearing, said assembly of pad elements including a plurality of circumferentially-spaced fluid intake slots each opening at their inner end into the bearing volume, said slots having a greater cross-sectional dimension in the axial direction and a lesser cross-sectional dimension in the circumferential direction, and resiliently compressible material in closed loop formation disposed about the assembly of pad elements and under compression between the pad elements and the housing so as to load the pad elements resiliently inwardly with respect to the housing.

2. A fluid pad bearing member, as claimed in claim 1, wherein the resiliently compressible material is arranged as two axially spaced loops which serve, with the internal surface of the housing and the external surface of the elements of the pad assembly, to define a fluid feed channel communicating with the outer end of all of the fluid feed slots.

3. A fluid pad bearing member, as claimed in claim 2, wherein the outer surface of the pad elements is provided with a respective outwardly facing recess of U-section for the seating of each loop.

4. A fluid pad bearing member, as claimed in claim 1, wherein the median longitudinal plane of each slot is a tangent to a circle coaxial with the axis of rotation of the bearing.

5. A fluid pad bearing member, as claimed in claim 1, wherein each pad element has an upstream lever arm and a downstream lever arm, considered in the direction of relative rotation of the bearing surface of the journal member, and wherein each such slot is formed within the body of a pad element and passes through the upstream lever arm of that element for feeding fluid to a position beneath the bearing surface of that lever arm.

6. A fluid pad bearing member, as claimed in claim 5, wherein the pad elements abut in fluid-tight manner at their adjacent ends so as to form a non-gapped assembly.

7. A fluid pad bearing member, as claimed in claim 1, wherein each pad element has an upstream lever arm and a downstream lever arm, considered in the direction of relative rotation of the bearing surface of the journal member, the pad elements each being formed at each end with mating surfaces such that neighboring pad elements abut against each other by axially-spaced lands defining a fluid intake slot between them, said mating surfaces being shaped such that they remain in abutment under resilient inward loading through the range of pivoting movement of the pad elements.

8. A fluid pad bearing member, as claimed in claim 5, wherein the upstream lever arm of each pad element includes a Rayleigh step formation.

9. A fluid pad bearing member, as claimed in claim 1, wherein each pad element includes on its radially external surface a projection disposed intermediate its ends to serve as a fulcrum for the pivoting movement of the pad element.

10. A fluid pad bearing member, as claimed in claim 1, wherein the pad elements are made of silicon nitride.

* * * * *